United States Patent
Schell

(10) Patent No.: US 6,371,890 B1
(45) Date of Patent: Apr. 16, 2002

(54) COMBINATION TWIST GRIP FOR MOTORCYCLES

(75) Inventor: Marco Schell, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/554,759

(22) PCT Filed: Nov. 2, 1998

(86) PCT No.: PCT/EP98/06919

§ 371 Date: May 19, 2000

§ 102(e) Date: May 19, 2000

(87) PCT Pub. No.: WO99/25605

PCT Pub. Date: May 27, 1999

(30) Foreign Application Priority Data

Nov. 19, 1997 (DE) .......................... 197 51 211

(51) Int. Cl.[7] .............................................. B60K 41/20
(52) U.S. Cl. ...................................................... 477/209
(58) Field of Search ........................ 74/484 R, 485, 74/486, 488; 477/209

(56) References Cited

U.S. PATENT DOCUMENTS

| 4,286,699 | A | * | 9/1981 | Pawelka | ....................... 192/1 |
|---|---|---|---|---|---|
| 4,286,700 | A | * | 9/1981 | Morris et al. | ................... 192/1 |
| 4,580,537 | A | | 4/1986 | Uchiyama | .................... 123/352 |
| 4,607,733 | A | | 8/1986 | Dodge | .......................... 192/35 |
| 4,681,198 | A | | 7/1987 | Costa Mas | .................... 192/35 |
| 5,261,291 | A | * | 11/1993 | Schoch et al. | ............ 74/484 R |
| 5,386,366 | A | | 1/1995 | Roll et al. | ............. 364/426.01 |

FOREIGN PATENT DOCUMENTS

| DE | 58 235 | 5/1967 |
|---|---|---|
| DE | 29 09 611 A1 | 3/1979 |
| DE | 35 14 296 A1 | 4/1985 |
| DE | 195 47 408 A1 | 12/1995 |

* cited by examiner

Primary Examiner—Sherry Estremsky
(74) Attorney, Agent, or Firm—Crowell & Moring LLP

(57) ABSTRACT

A combination turning handle for controlling operation of a fuel mixture feeding element and braking elements for the front and rear wheels of a motorcycle or other vehicle comprises a torque sensor which measures a positive or negative torque exerted by the driver on the turning handle for increasing or for decreasing the speed. Two servo units respond to the measured value of the torque sensor, actuate the fuel mixture feeding element or the two braking elements, and a speed sensor measures the momentary speed of the motorcycle. A servo motor rotates the turning handle by an angle corresponding to the measured value of the speed sensor.

9 Claims, 2 Drawing Sheets

COMBINATION TWIST GRIP FOR MOTORCYCLES

BACKGROUND AND SUMMARY OF THE INVENTION

This application claims the priority of German patent document 197 51 211.9, filed Nov. 19, 1997 and PCT International Application No. PCT/EP98/06919, filed Nov. 2, 1998, the disclosures of which is expressly incorporated by reference herein.

The invention relates to a combination turning handle for a motorcycle, for alternately operating the fuel mixture feeding element and the braking elements for the front and rear, wheels.

In a conventional motorcycle, the turning handle is used exclusively for operating the fuel mixture feeding element, for example, a throttle valve; and a separate hand or foot brake lever is provided for operating the braking elements for the front and rear wheels. When the driver rotates the turning handle downward to increase the speed, he will notice the occurring acceleration because of the inertial force affecting his body. When the front and/or rear wheel brake is operated, the perception of the deceleration takes place analogous. However, ergonomically, it would be much more advantageous for the driver to receive a feedback directly from the operating part causing an increase or a reduction of the driving speed, which indicates to him the acceleration or the deceleration of the motorcycle.

It is therefore an object of the invention to provide a combination turning handle of the above-mentioned type which meets this requirement.

This and other objects and advantages are achieved according to the invention, in which an "active" turning handle is provided which controls the complete longitudinal dynamics (that is, the acceleration and the deceleration of the motorcycle) and simultaneously sends a feedback to the driver. Since the positive or negative torque exerted on the turning handle is a measurement of an intended increase or the reduction of the speed, while the rotational position of the handle is controlled as a function of the vehicle speed, the driver feels the occurring acceleration or deceleration of the motorcycle directly on the turning handle. The combination turning handle according to the invention therefore permits a close connection between the driver and the motorcycle, which promotes driving safety.

Since a servo motor causes the turning handle to follow the measured value of the speed sensor, a defined driving speed is assigned to each angle of rotation. In order to maintain a certain speed, the turning handle therefore need only be held in a certain angular position.

Other objects, advantages and novel features of the present invention will become apparent from the following detailed description of the invention when considered in conjunction with the accompanying drawings.

DETAILED DESCRIPTION OF THE DRAWINGS

Figure 1:
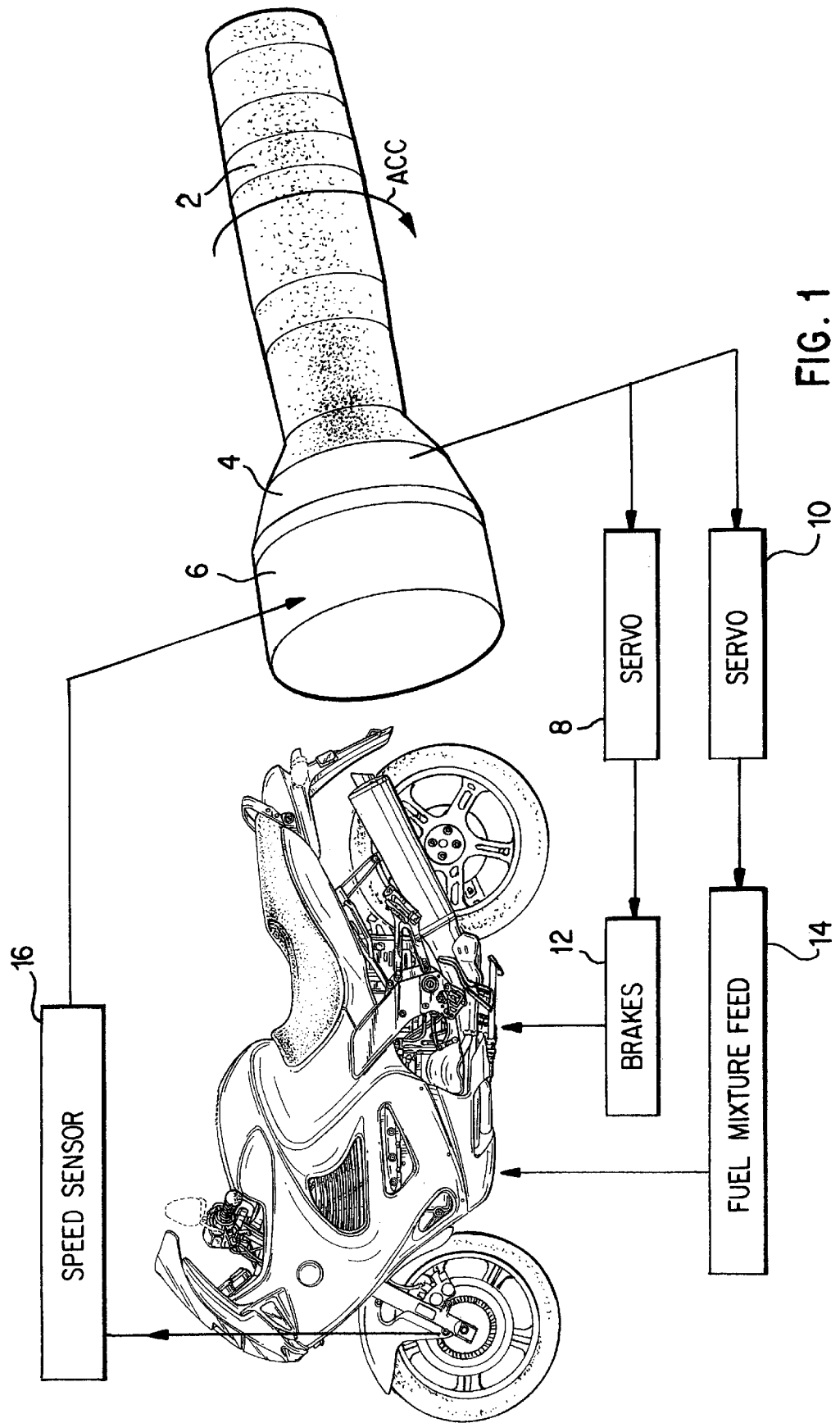
FIG. 1 is a schematic representation of a combination turning handle in connection with a block diagram.

A turning handle 2, a torque sensor 4 and a servo motor 6 are arranged at the right-hand end of the handle bar (not shown). A servo unit 8 for operating a braking system 12 and a servo unit 10 for operating a fuel mixture feeding element 14 are electrically connected with the torque sensor 4. A speed sensor 16, which measures the momentary speed of the motorcycle, controls the servo motor 6, for example, a stepping motor. The braking system 12 comprises the braking elements for the front and rear wheel of the motorcycle. A brake power proportioning device is provided which automatically causes an appropriate distribution of the braking force exercised on the front and rear wheel in a known manner. The fuel mixture feeding element 14 may be a throttle valve or an injection device. For reasons of simplicity, the element 14 will be called a throttle valve in the following.

The turning handle 2 is used for accelerating as well as for braking the motorcycle. When the driver wants to accelerate the motorcycle, that is, increase the speed, he exerts a positive torque (directed downward as shown by the arrow ACC in the figure) onto the turning handle 2. The amount and the direction of this torque is measured by the torque sensor 4, and the corresponding acceleration signal is transmitted to the servo unit 10. The servo unit 10 actuates the throttle valve 14 corresponding to the measured value of the torque sensor 4 in the opening direction. As a result, more fuel is fed to the engine, which results in an increase of the engine power and of the speed of the motor cycle.

The momentary speed of the motorcycle is measured by the speed sensor 16, which emits a corresponding measuring signal to the servo motor 6. The servo motor 6 will then rotate the turning handle 2 connected with it by an angle which corresponds to the received measuring signal. The angular position of the turning handle 2 therefore corresponds to the speed of the motorcycle, and thus increases in the direction of arrow ACC as the speed increases. When the driver wants to end the acceleration, that is, no longer wants to increase the speed, he holds the turning angle 2 fixedly in the reached end position.

If the speed drops because the road resistance is increasing, for example, in the case of a slope, the servo motor will rotate the turning handle 2 in the opposite direction. However, if the driver counteracts this rotation by exerting a corresponding positive torque on the turning handle 3, this increase of the torque is detected by the torque sensor 4. The signal supplied by the torque sensor 4 to the servo unit 10 therefore changes for further opening the throttle valve 14. The power of the engine will therefore increase so that the speed of the motorcycle can be kept constant.

However, when the speed of the motorcycle increases because the road resistance decreases, for example, in the case of a gradient, the servo motor 6 will rotate the turning handle 2 in the positive direction corresponding to the change of the signal received from the speed sensor 16. When the driver wants to keep this speed constant, he can fixedly hold the turning handle 2 in the momentary position by applying a corresponding negative torque (in the direction opposite the arrow ACC). The torque sensor 4 detects this negative torque and supplies a corresponding signal to the throttle valve 14 in order to close it. The power of the engine is therefore reduced so that the speed remains constant.

As indicated in the above description, a certain angular position of the turning handle 2 is assigned to each speed of the motorcycle. The speed of the motorcycle can therefore be kept constant independently of the respective road resistance in that the turning handle 2 is kept in its angular position corresponding to the desired speed.

When the motorcycle is to be braked, that is, decelerated, the driver exercises a negative torque (directed upward, in the direction opposite that of arrow ACC in the figure) on the turning handle 2. The torque sensor 4 detects the amount and the direction of this torque and emits a corresponding signal to the servo unit 8 which actuates the braking system 12 for the front and the rear wheel of the motorcycle. The resulting occurring reduction of the speed is detected by the speed sensor 16 which supplies a corresponding signal to the servo motor 6. The servo motor 6 correspondingly rotates the turning handle 2 or causes it to follow. As soon as the motorcycle has reached the desired reduced speed, the driver will no longer exercise a negative torque onto the turning handle 2. The torque sensor 4 therefore supplies a corresponding signal to the servo unit 8 for releasing the brake system 12. The motorcycle will then maintain the speed corresponding to the momentary angular position of the turning handle 2, as explained above. If the driver wants to increase the speed again, he will exercise a positive torque onto the turning handle 2.

Because the turning handle 2 responds to the positive or negative torque exerted by the operator for accelerating or decelerating, the driver receives a direct feedback concerning the occurred change of the driving speed.

Figure 2:
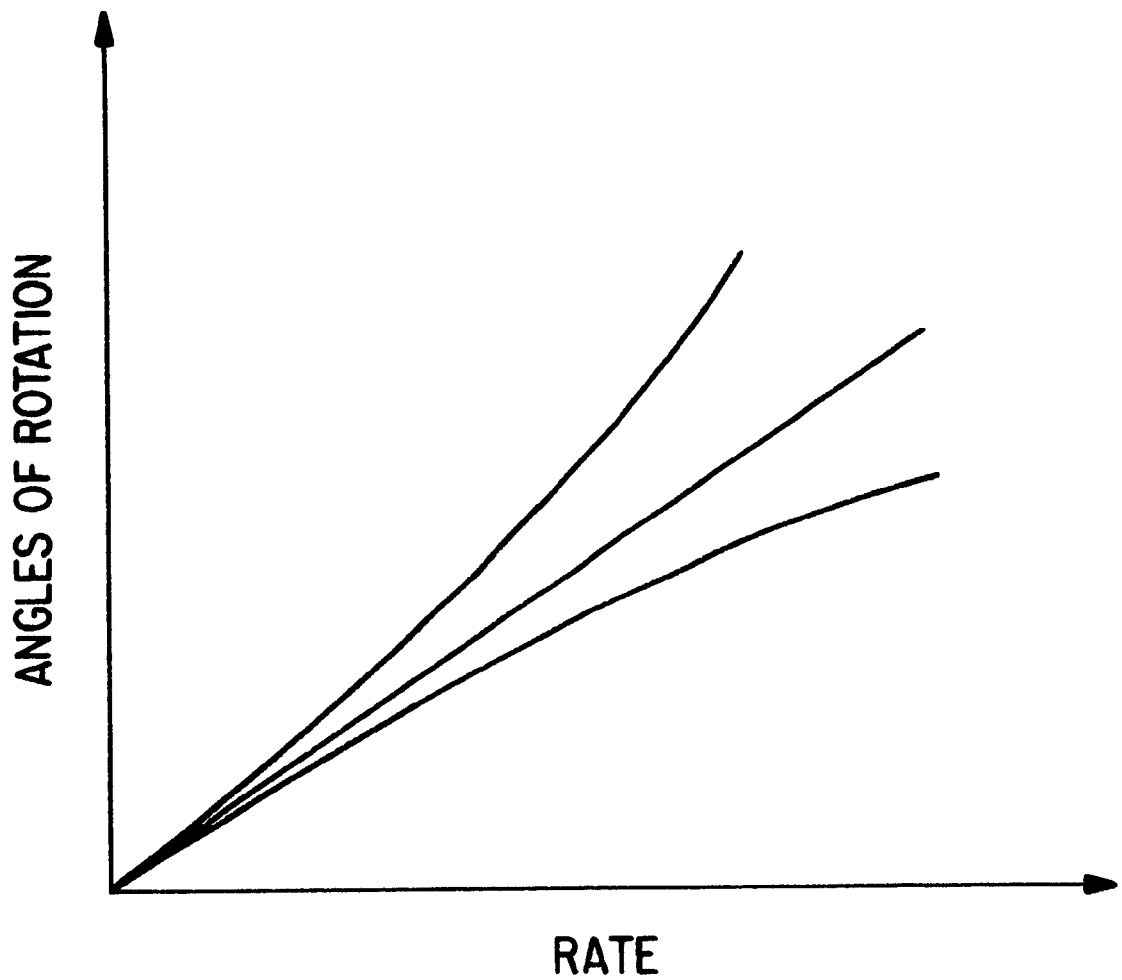
FIG. 2 is a graphic representation which illustrates the relationship between the momentary speed of a motorcycle and the angle of rotation of the turning handle.

FIG. 2 of the drawing illustrates the relationship between the driving speed of the motorcycle and the angle of rotation of the turning handle 2. As illustrated, this relationship may be proportional, degressive or progressive. This characteristic can be set either at the factory or by the driver. Expediently, the "hardness" of the turning handle 2, that is, the ratio between the torque exercised on the turning handle 2 and the adjusting path of the two servo units 8 and 10 can be adjusted so that it can be adapted to the personal requirements of the male or female driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A combination turning handle for controlling operation of a fuel mixture feeding element and braking elements of a vehicle, comprising:

a turning handle which is rotatable about an axis thereof;

a torque sensor which measures a positive or negative torque exerted on the turning handle for increasing or decreasing vehicle speed;

first and second servo units which actuate the fuel mixture feeding element and the braking elements respectively corresponding to a measured positive or negative value measured by the torque sensor;

a speed sensor which measures the momentary speed of the motorcycle; and a servo motor which rotates the turning handle by an angle corresponding to a vehicle speed measured by the speed sensor.

2. The combination turning handle according to claim 1, wherein a brake power proportioning device is assigned to the braking elements (12) for the front and the rear wheel.

3. The combination turning handle according to claim 1, wherein a torque/path ratio of the servo units can be preset.

4. The combination turning handle according to claim 1, wherein a characteristic of speed feedback is variable.

5. A method for controlling operation of a vehicle having a rotatable control handle, first and second actuators for operating a fuel mixture feeding element and vehicle brakes, respectively, and a vehicle speed sensor, comprising:

controlling at least one of said actuators as a function of a torque exerted on said control handle; and controlling an angular rotational position of said control handle solely as a function of vehicle speed detected by said vehicle speed sensor.

6. A method for controlling operation of a vehicle according to claim 5, wherein said first actuator controls an amount of fuel fed by said fuel mixture feeding element as a function of magnitude of a torque exerted on said control handle.

7. A method for controlling operation of a vehicle according to claim 6, wherein said second actuator controls a braking force applied by said vehicle brakes, as a function of magnitude of a torque exerted on said control handle.

8. A method for controlling operation of a vehicle according to claim 5, wherein said second actuator controls a braking force applied by said vehicle brakes, as a function of magnitude of a torque exerted on said control handle.

9. A method for controlling a vehicle having a rotatable control handle, comprising:

controlling at least one of vehicle acceleration and vehicle braking as a function of a torque exerted on said control handle; and controlling an angular rotational position of said control handle solely as a function of vehicle speed.

\* \* \* \* \*